(12) United States Patent
Shimomura et al.

(10) Patent No.: US 8,582,260 B2
(45) Date of Patent: Nov. 12, 2013

(54) INTEGRATED CIRCUIT

(75) Inventors: Hiroshi Shimomura, Fukuoka-ken (JP);
Masaru Numano, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 13/401,215

(22) Filed: Feb. 21, 2012

(65) Prior Publication Data

US 2012/0212869 A1 Aug. 23, 2012

(30) Foreign Application Priority Data

Feb. 23, 2011 (JP) ................................. 2011-037224

(51) Int. Cl.
*H02H 9/00* (2006.01)
(52) U.S. Cl.
USPC .......................................................... 361/56
(58) Field of Classification Search
USPC .......................................................... 361/56
See application file for complete search history.

(56) References Cited

U.S. PATENT DOCUMENTS

| | | | |
|---|---|---|---|
| 6,369,994 B1 * | 4/2002 | Voldman | 361/56 |
| 6,724,601 B2 * | 4/2004 | Lien et al. | 361/111 |
| 6,906,573 B2 | 6/2005 | Numano | |
| 8,427,798 B2 * | 4/2013 | Shimomura et al. | 361/56 |
| 2002/0140489 A1 * | 10/2002 | Maloney et al. | 327/310 |
| 2010/0244906 A1 * | 9/2010 | Ishida | 327/108 |
| 2011/0255201 A1 | 10/2011 | Shimomura et al. | |

FOREIGN PATENT DOCUMENTS

| | | |
|---|---|---|
| JP | 2004-222119 | 8/2004 |
| JP | 2008-218825 | 9/2008 |

* cited by examiner

*Primary Examiner* — Scott Bauer
(74) *Attorney, Agent, or Firm* — Oblon, Spivak, McClelland, Maier & Neustadt, L.L.P.

(57) ABSTRACT

According to one embodiment, an integrated circuit includes a first external terminal, a second external terminal, a third external terminal grounded, an output transistor connected to the second and third external terminals, an ESD protection circuit connected between the second external terminal and the third external terminal, a diode connected between the first and second external terminals, a power supply circuit connected between the first and third external terminals, an internal circuit connected between the power supply circuit and the third external terminal, a current source circuit, and a drive circuit having a first and second input terminals and an output terminal connected to the control electrode of the output transistor. When a voltage larger than a maximum rating voltage is applied to the second external terminal, the drive circuit turns off the output transistor and the ESD protection circuit operates.

16 Claims, 2 Drawing Sheets

INTEGRATED CIRCUIT

CROSS-REFERENCE TO RELATED APPLICATIONS

This application is based upon and claims the benefit of priority from the prior Japanese Patent Application No. 2011-037224, filed on Feb. 23, 2011; the entire contents of which are incorporated herein by reference.

FIELD

Embodiments described herein relate generally to an integrated circuit.

BACKGROUND

In an integrated circuit having a protection circuit for absorbing or removing electric charges at the time of applying an Electro Static Discharge (ESD), it is difficult to operate with high reliability the protection circuit in order to place priority on normal operation. There are some cases in which elements to be protected fundamentally operate at the time of applying an ESD and in consequence of it, the operation of the protection circuit stops.

DETAILED DESCRIPTION

Figure 1:
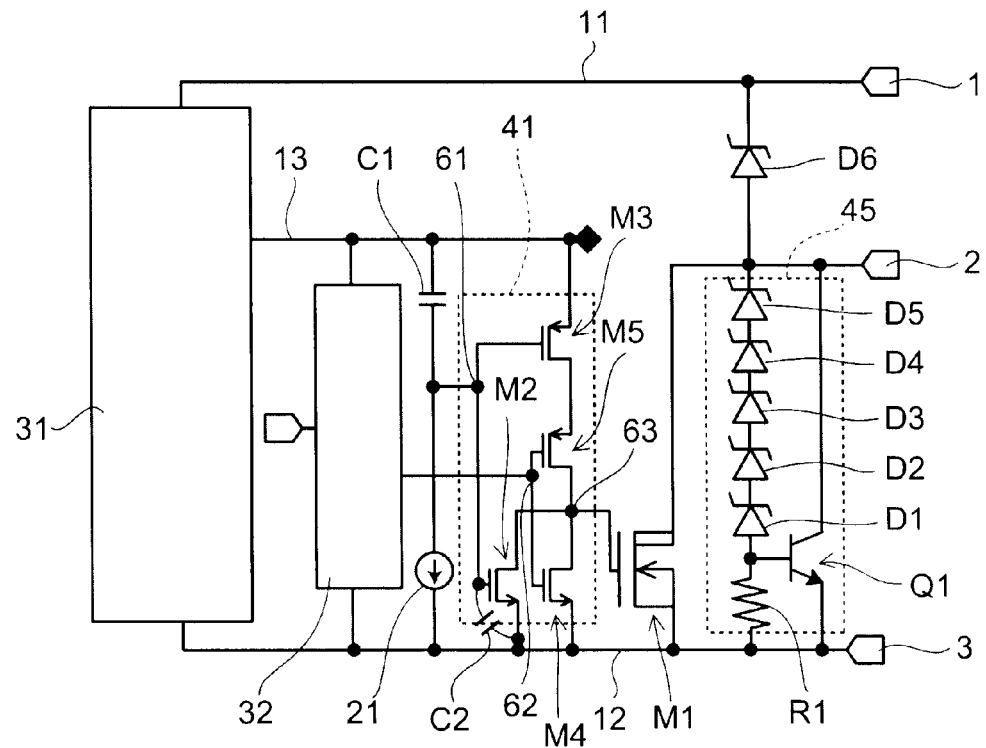
FIG. 1 is a circuit diagram of an integrated circuit according to a first embodiment.

According to one embodiment, an integrated circuit includes: a first external terminal connected to an external power supply; a second external terminal; a third external terminal grounded; an output transistor having a first electrode connected to the second external terminal, a second electrode connected to the third external terminal, and a control electrode; an Electro Static Discharge (ESD) protection circuit connected between the second external terminal and the third external terminal; a diode connected between the first external terminal and the second external terminal, with a direction going from the second external terminal toward the first external terminal being set as a forward direction; a power supply circuit connected between the first external terminal and the third external terminal; an internal circuit connected between an output line of the power supply circuit and the third external terminal; a current source circuit including a capacitor and a current source connected in series between the output line of the power supply circuit and the third external terminal; and a drive circuit having a first input terminal connected between the capacitor and the current source, a second input terminal connected to an output terminal of the internal circuit, and an output terminal connected to the control electrode of the output transistor. When a voltage larger than a maximum rating voltage is applied to the second external terminal, the drive circuit turns off the output transistor and the ESD protection circuit operates.

Embodiments will now be described with reference to the accompanying drawings. Same reference numerals are added to the same elements in each of the drawings.

(First Embodiment)

FIG. 1 is a circuit diagram of an integrated circuit according to a first embodiment.

Components shown in FIG. 1 are integrated into the same semiconductor substrate or one chip. The integrated circuit according to the embodiment has three external terminals. An external power supply terminal 1 as a first external terminal is connected to an external power supply. An output terminal 2 as a second external terminal is connected to a subject to be driven (for example, a power device) by the integrated circuit. A ground terminal 3 as a third external terminal is grounded. The external power supply terminal 1 is connected to a power supply line 11, and the ground terminal 3 is connected to a ground line 12.

An output transistor M1 is connected between the output terminal 2 and the ground terminal 3. The output transistor M1 is a Field Effect Transistor (FET) having a double diffusion MOS (DMOS) structure, for example.

A drain which is a first electrode of the output transistor M1 is connected to the output terminal 2. A source which is a second electrode of the output transistor M1 is connected to the ground terminal 3.

In addition, an Electro Static Discharge (ESD) protection circuit 45 is connected between the output terminal 2 and the ground terminal 3. The output transistor M1 and the ESD protection circuit 45 are connected in parallel between the output terminal 2 and the ground terminal 3. The ESD protection circuit 45 includes a bipolar transistor Q1, Zener diodes D1 to D5, and a resistor R1.

The bipolar transistor Q1 is an npn-type bipolar transistor, for example. A collector of the bipolar transistor Q1 is connected to the output terminal 2. An emitter of the bipolar transistor Q1 is connected to the ground terminal 3. A base which is a control electrode of the bipolar transistor Q1 is connected between the Zener diode D1 and the resistor R1.

The plurality of Zener diodes D1 to D5 are connected in series between the output terminal 2 and the base of the bipolar transistor Q1. In the plurality of Zener diodes D1 to D5, a direction going from the base of the bipolar transistor Q1 toward the output terminal 2 is set as a forward direction. If a potential difference between the output terminal 2 and the ground terminal 3 becomes larger than a maximum rating voltage at the time of normal operation, the Zener diodes D1 to D5 break down and supply electric current to the base of the bipolar transistor Q1. The number of the Zener diodes is not limited to five but is arbitrary.

The resistor R1 is connected between the base of the bipolar transistor Q1 and the ground terminal 3.

A diode D6 is connected between the external power supply terminal 1 and the output terminal 2. In the diode D6, a direction going from the output terminal 2 toward the external power supply terminal 1 is set as a forward direction. If a voltage larger than the maximum rating voltage is applied between the output terminal 2 and the ground terminal 3, electric current flows into the power supply line through the diode D6.

A power supply circuit 31 is connected between the power supply line 11 and the ground line 12. The power supply circuit 31 adjusts a voltage of the external power supply and outputs a predetermined voltage (constant voltage) to the output line 13.

An internal circuit 32 is connected between an output line 13 of the power supply circuit 31 and the ground line 12. In addition, a current source circuit including a capacitor C1 and a current source 21 is connected between the output line 13 of the power supply circuit 31 and the ground line 12. The current source 21 is constituted by a current mirror circuit, for example.

The current source circuit and the internal circuit 31 are connected to an input terminal of a NOR circuit 41. The NOR circuit 41 functions as a drive circuit driving a gate which is a control electrode of the output transistor M1. The NOR circuit 41 includes a first input terminal 61, a second input terminal 62, an output terminal 63, and transistors M2 to M5.

The first input terminal 61 is connected between the capacitor C1 and the current source 21. The capacitor C1 is connected between the output line 13 of the power supply circuit 31 and the first input terminal 61 of the NOR circuit 41. The current source 21 is connected between the first input terminal 61 and the ground line 12.

The second input terminal 62 of the NOR circuit 41 is connected to an output terminal of the internal circuit 32. The output terminal 63 of the NOR circuit 41 is connected to the gate of the output transistor M1.

The transistor M3 and the transistor M5 are p-type metal-oxide-semiconductor field effect transistors (MOSFETs), for example. The transistor M3 and the transistor M5 are connected in series between the output line 13 of the power supply circuit 31 and the output terminal 63 of the NOR circuit 41.

The transistor M2 and the transistor M4 are n-type MOSFETs, for example. The transistor M2 and the transistor M4 are connected in parallel between the output terminal 63 of the NOR circuit 41 and the ground line 12.

A gate of the transistor M3 and a gate of the transistor M2 are connected to the first input terminal 61. A gate of the transistor M5 and a gate of the transistor M4 are connected to the second input terminal 62.

A capacitance of the capacitor C1 is larger than a gate capacitance (parasitic capacitance) of the transistor M2 in the NOR circuit 41.

Next, an operation of the integrated circuit according to the embodiment will be described.

When a positive voltage (ESD voltage) larger than the maximum rating voltage at the time of normal operation is applied to the output terminal 2, a part of ESD electric charges flows into the power supply line 11 through the diode D6. Therefore, at the same time when the ESD is applied, the power supply circuit 31 is activated and a potential of the output line 13 of the power supply circuit 31 rises.

The ESD is applied for about 1 to 10 nanoseconds, for example. The current source 21 constituted by a current mirror responds slowly, and thus the current source 21 cannot operate at the time of applying the ESD. That is, no current flows into the current source 21.

Due to the rise of a potential of the output line 13 in the power supply circuit 31, an electric charge moves between the capacitor C1 and the gate capacitance C2 of the transistor M2. Here, the gate capacitance C2 is sufficiently large. Therefore, a potential of the first input terminal 61 in the NOR circuit 41 rises to a potential close to a potential of the output line 13.

That is, since the potential of the first input terminal 61 in the NOR circuit 41 is at a high level, a potential of the output terminal 63 in the NOR circuit 41 becomes a low level (a potential equal to the potential of the ground line 12) regardless of the potential of the second input terminal 62. Therefore, the gate potential of the output transistor M1 becomes a low level, and the output transistor M1 turns off.

That is, at the time of applying the ESD, the NOR circuit 41 outputs a low level to the gate of the output transistor M1 regardless of the output of the internal circuit 32 connected to the second input terminal 62, thereby surely turning off the output transistor M1.

When the output transistor M1 is turned off, the potential of the output terminal 2 rises. Because of this, the Zener diodes D1 to D5 in the ESD protection circuit 45 break down, and current is supplied from the output terminal 2 to the base of the bipolar transistor Q1, and thus the bipolar transistor Q1 turns on.

When the bipolar transistor Q1 turns on, the bipolar transistor Q1 consumes the ESD electric charge applied to the output terminal 2. The output transistor M1 in the off state does not consume the ESD electric charge, thereby being able to prevent breakage of the output transistor M1. That is, at the time of applying the ESD, it is possible to realize stable operation of the ESD protection circuit 45 without operating the output transistor M1 to be protected.

The Zener diodes D1 to D5 do not break down at the time of normal operation in which a voltage between the output terminal 2 and the ground terminal 3 is lower than the maximum rating voltage. Furthermore, the resistor R1 is connected between the base and emitter of the bipolar transistor Q1. Therefore, at the time of normal operation, the bipolar transistor Q1 does not turn on and the ESD protection circuit 45 does not operate.

At the time of normal operation, the power supply circuit 31 adjusts appropriately a voltage of an external power supply connected to the external power supply terminal 1 and outputs a predetermined constant voltage to the output line 13. In the steady state, the current source 21 operates.

Therefore, the potential of the first input terminal 61 in the NOR circuit 41 is almost equal to the potential of the ground line 12 and is at a low level. Since the potential of the first input terminal 61 in the NOR circuit 41 is at a low level, the output of the NOR circuit 41 depends only on the potential of the second input terminal 62. When the second input terminal 62 is at a low level, the output terminal 63 becomes a high level, and when the second input terminal 62 is at a high level, the output terminal 63 becomes a low level.

Since the second input terminal 62 is connected to the output terminal of the internal circuit 32, the output of the NOR circuit 41 depends only on the output of the internal circuit 32. That is, at the time of normal operation, based on an output signal from the internal circuit 32, the output transistor M1 is turned on and off and a desired voltage is output to the output terminal 2.

(Second Embodiment)

Figure 2:
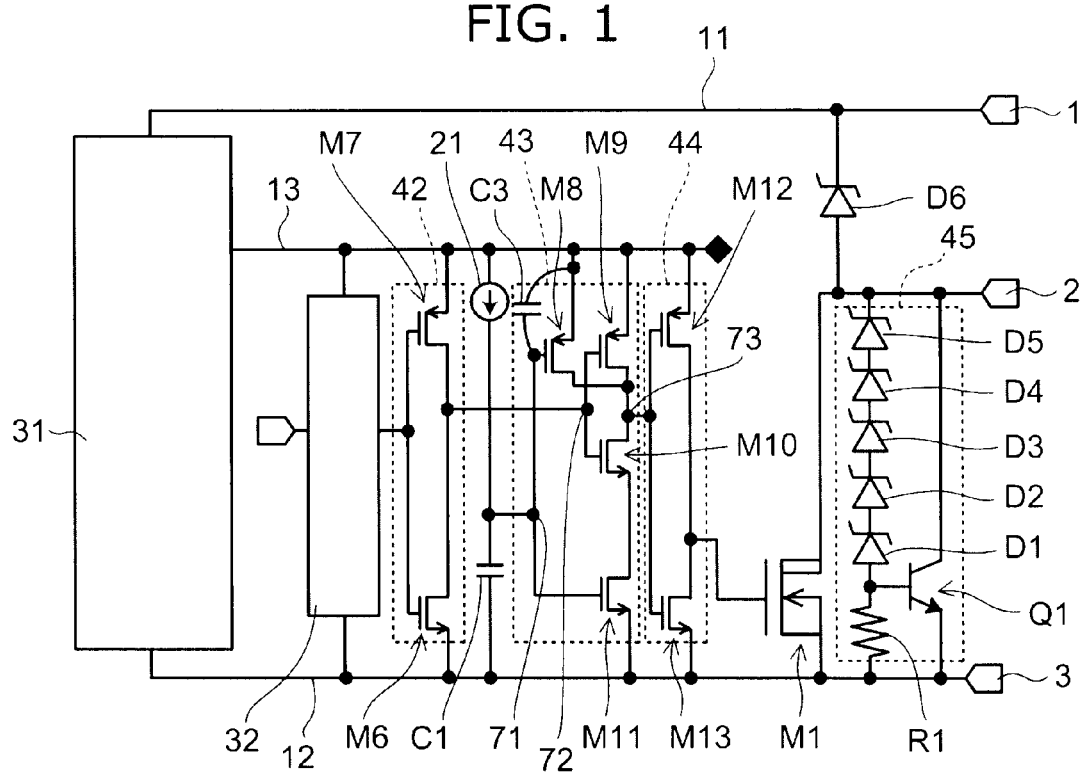
FIG. 2 is a circuit diagram of an integrated circuit according to a second embodiment.

FIG. 2 is a circuit diagram of an integrated circuit according to a second embodiment. The same elements as the elements of the integrated circuit according to the first embodiment shown in FIG. 1 are designated by the same reference numerals.

Elements shown in FIG. 2 are integrated into the same semiconductor substrate or one chip. In the embodiment, an inverter 42, a NAND circuit 43, and an inverter 44 are connected between the output terminal of the internal circuit 32 and the gate of the output transistor M1. The inverter 42, the NAND circuit 43, and the inverter 44, function as a drive circuit driving the gate of the output transistor M1.

An input terminal of the inverter 42 is connected to the output terminal of the internal circuit 32. An output terminal of the inverter 42 is connected to a second input terminal 72 of the NAND circuit 43.

The inverter 42 has a transistor M7 and a transistor M6 connected in series between the output line 13 of the power supply circuit 31 and the ground line 12. The transistor M7 is a p-type MOSFET, and the transistor M6 is an n-type MOS- FET. A gate of the transistor M7 and a gate of the transistor M6 are connected to the input terminal of the inverter 42.

A current source circuit including the current source 21 and the capacitor C1 is connected between the output line 13 of the power supply circuit 31 and the ground line 12. The current source 21 is constituted by a current mirror circuit, for example.

The NAND circuit 43 includes transistors M8 to M11. A first input terminal 71 of the NAND circuit 43 is connected between the current source 21 and the capacitor C1. The current source 21 is connected between the output line 13 of the power supply circuit 31 and a first input terminal 71 of the NAND circuit 43. The capacitor C1 is connected between the first input terminal 71 and the ground line 12.

The transistor M8 and the transistor M9 are p-type MOSFETs, for example. The transistor M8 and the transistor M9 are connected in parallel between the output line 13 of the power supply circuit 31 and the output terminal 73 of the NAND circuit 43.

The transistor M10 and the transistor M11 are n-type MOSFETs, for example. The transistor M10 and the transistor M11 are connected in series between the output terminal 73 of the NAND circuit 43 and the ground line 12.

A gate of the transistor M8 and a gate of the transistor M11 are connected to the first input terminal 71. A gate of the transistor M9 and a gate of the transistor M10 are connected to the second input terminal 72.

An output terminal 73 of the NAND circuit 43 is connected to the input terminal of the inverter 44. An output terminal of the inverter 44 is connected to the gate of the output transistor M1.

The inverter 44 has a transistor M12 and a transistor M13 connected in series between the output line 13 of the power supply circuit 31 and the ground line 12. The transistor M12 is a p-type MOSFET, and the transistor M13 is an n-type MOSFET. A gate of the transistor M12 and a gate of the transistor M13 are connected to the output terminal 73 of the NAND circuit 43.

A capacitance of the capacitor C1 is larger than a gate capacitance (parasitic capacitance) of the transistor M8 in the NAND circuit 43.

Next, an operation of the integrated circuit according to the embodiment will be described.

When a positive voltage (ESD voltage) larger than the maximum rating voltage at the time of normal operation is applied to the output terminal 2, a part of ESD electric charges flows into the power supply line 11 through the diode D6. Therefore, at the same time when the ESD is applied, the power supply circuit 31 is activated and a potential of the output line 13 of the power supply circuit 31 rises.

The ESD is applied for about 1 to 10 nanoseconds, for example. The current source 21 constituted by a current mirror responds slowly, and thus the current source 21 cannot operate at the time of applying the ESD. That is, no current flows into the current source 21.

Due to the rise of a potential of the output line 13 in the power supply circuit 31, an electric charge moves between the gate capacitance C3 of the transistor M8 and the capacitor C1. Here, the gate capacitance C3 is sufficiently large. Therefore, a potential of the first input terminal 71 in the NAND circuit 43 becomes a low level which is almost equal to a potential of the ground line 12.

That is, since the potential of the first input terminal 71 in the NAND circuit 43 is at a low level, a potential of the output terminal 73 in the NAND circuit 43 becomes a high level (a potential almost equal to the potential of the ground line 13 in the power supply circuit 31) regardless of the potential of the second input terminal 72. Since an output of the NAND circuit 43 is at a high level, the inverter 44 which receives the output as an input outputs a low level to the gate of the output transistor M1. Because of this, the output transistor M1 turns off.

That is, at the time of applying the ESD, the gate of the output transistor M1 becomes a low level regardless of the output of the internal circuit 32 (the potential of the second input terminal 72), and thus the output transistor M1 is surely turned off.

When the output transistor M1 is turned off, the potential of the output terminal 2 rises. Accordingly, the Zener diodes D1 to D5 in the ESD protection circuit 45 break down, and current is supplied from the output terminal 2 to the base of the bipolar transistor Q1, and thus the bipolar transistor Q1 turns on.

When the bipolar transistor Q1 turns on, the bipolar transistor Q1 consumes the ESD electric charge applied to the output terminal 2. The output transistor M1 in the off state does not consume the ESD electric charge, thereby being able to prevent breakage of the output transistor M1. That is, at the time of applying the ESD, it is possible to realize stable operation of the ESD protection circuit 45 without operating the output transistor M1 to be protected.

The Zener diodes D1 to D5 do not break down at the time of normal operation in which a voltage between the output terminal 2 and the ground terminal 3 is lower than the maximum rating voltage. Furthermore, the resistor R1 is connected between the base and emitter of the bipolar transistor Q1. Therefore, at the time of normal operation, the bipolar transistor Q1 does not turn on and the ESD protection circuit 45 does not operate.

At the time of normal operation, the power supply circuit 31 appropriately adjusts a voltage of an external power supply connected to the external power supply terminal 1 and outputs a predetermined constant voltage to the output line 13. In the steady state, the current source 21 operates.

Therefore, the potential of the first input terminal 71 in the NAND circuit 43 rises to a potential close to the potential of the output line 13 of the power supply circuit 31 and becomes a high level. Since the potential of the first input terminal 71 in the NAND circuit 43 is at a high level, the output of the NAND circuit 43 depends only on the potential of the second input terminal 72. When the second input terminal 72 is at a low level, the output terminal 73 becomes a high level, and when the second input terminal 72 is at a high level, the output terminal 73 becomes a low level.

Since the second input terminal 72 is connected to the output terminal of the internal circuit 32 via the inverter 42, the output of the NAND circuit 43 depends only on the output of the internal circuit 32. That is, at the time of normal operation, based on an output signal from the internal circuit 32, the output transistor M1 is turned on and off and a desired voltage is output to the output terminal 2.

In the embodiments described above, a transistor parasitic diode may be used as diode D6. Furthermore, MOSFET may be used instead of the bipolar transistor Q1.

The integrated circuit according to the above-described embodiments can be used as a circuit driving high breakdown voltage and high output element such as Insulated Gate Bipolar Transistor (IGBT) and power MOSFET.

Figure 3:
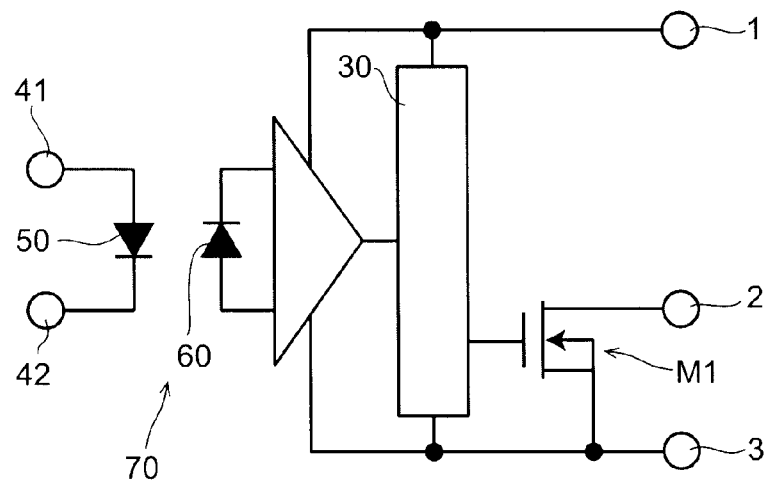
FIG. 3 is a circuit diagram of a circuit in which the integrated circuit according to the embodiments is combined with a photo-coupler.

FIG. 3 is a circuit diagram of a circuit in which the integrated circuit according to the embodiments is combined with a photo-coupler 70.

In FIG. 3, only a part of the foregoing components of the integrated circuit is shown. In addition, a circuit 30 shown in FIG. 3 includes an internal circuit 32, a drive circuit driving the gate of the output transistor M1, and the like.

The photo-coupler 70 has a light-emitting element 50 and a light-receiving element 60. An anode of the light-emitting element 50 is connected to one input terminal 41, and a cathode of the light-emitting element 50 is connected to the other input terminal 42.

Electric signals input into the input terminals 41 and 42 are converted into light by the light-emitting element 50, and the light-receiving element 60 is brought into conduction by the light, and the signals are transferred to the circuit 30.

Since the input terminals 41 and 42 and the output terminal 2 are electrically insulated, these terminals can be used for signal transfer while maintaining insulation between two-system circuits each driven by an independent power supply.

Figure 4:
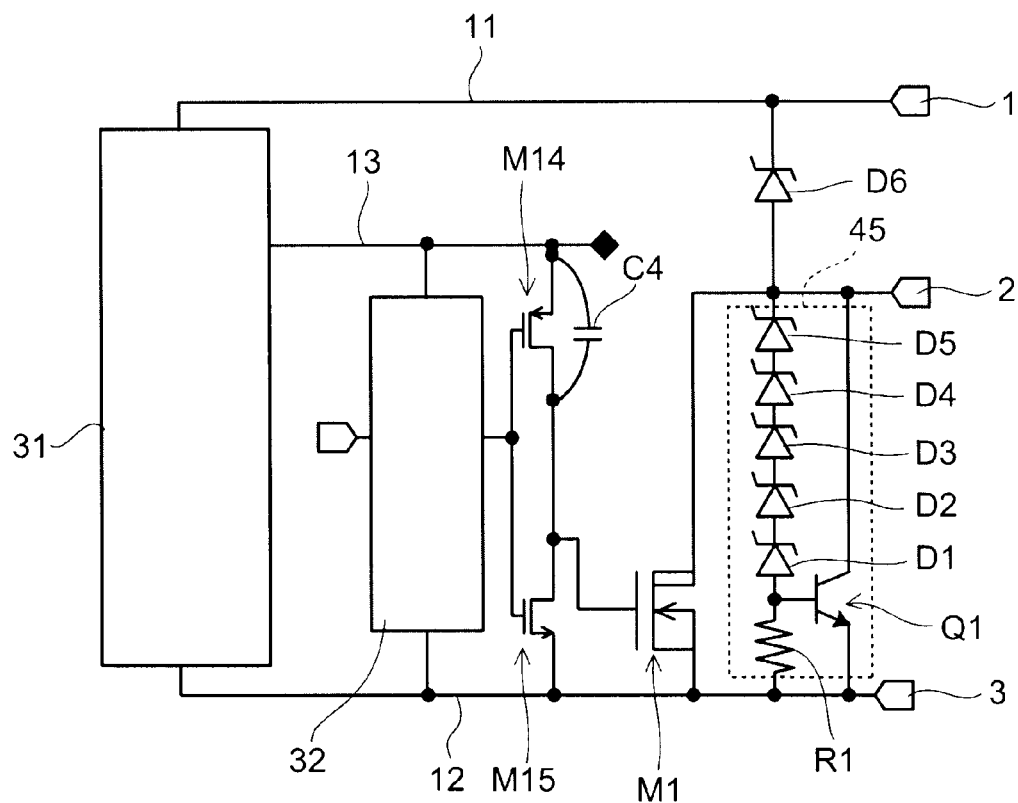
FIG. 4 shows a circuit diagram of an integrated circuit according to a comparative example.

Here, FIG. 4 shows a circuit diagram of an integrated circuit according to a comparative example. The same elements as the elements of the integrated circuit according to the above-described embodiments are designated by the same reference numerals.

In the circuit of the comparative example, an inverter is connected between the output terminal of the internal circuit 32 and the gate of the output transistor M1. An input terminal of the inverter is connected to the output terminal of the internal circuit 32, and an output terminal of the inverter is connected to the gate of the output transistor M1.

The inverter includes transistors M14 and M15 connected in series between the output line 13 of the power supply circuit 31 and the ground line 12. A gate of the transistor M14 and a gate of the transistor M15 are connected to the output terminal of the internal circuit 32.

A low output resistance is required at the high-voltage integrated circuit using a DMOS for the output transistor M1. Therefore, on the semiconductor substrate, a pad serving as output terminal 2 and the output transistor M1 are laid out such that a distance between the two becomes shortest, and the output terminal 2 and the output transistor M1 are connected by a bold metal wiring.

The ESD protection circuit 45 is preferably close to the output terminal 2. However, if a low output resistance is prioritized, the ESD protection circuit 45 is forced to be laid out at a position distant from the output terminal 2.

The ESD application takes place at as a high speed and the ESD is applied for about 1 to 10 nanoseconds. Therefore, if the ESD protection circuit 45 is located at a position distant from the output terminal 2 to which ESD is applied, there are cases in which the ESD protection circuit 45 responds slowly and thus cannot absorb ESD electric charges.

When ESD is applied to the output terminal 2, a part of the ESD electric charges reaches the power supply circuit 31 via the diode D6. If the power supply circuit 31 can respond at a high speed, the potential of the output line 13 rises quickly. However, since the current mirror circuit used for a current source responds slowly, the internal circuit 32 generally does not start at a high speed. Therefore, an output of the internal circuit 32 is in a floating state, and as a result, the gate potential of the output transistor M1 is not settled.

The gate potential of the output transistor M1 may rise at the time of applying an ESD, due to various parasitic capacitances connected to the gate of the output transistor M1.

There are cases in which, for example, the gate potential of the output transistor M1 rises and the output transistor M1 turns on due to the parasitic capacitance C4 of the transistor M14 in front of the output transistor M1, or the like. However, a parasitic capacitance generally cannot be guaranteed or managed, and thus has poor reliability in surely increasing the gate potential of the output transistor M1 at the time of applying an ESD.

When the gate potential of the output transistor M1 rises, the output transistor M1 turns on to absorb ESD electric charges. At the time of applying an ESD, if the gate potential of the output transistor M1 does not increase and the output transistor M1 is in an off state, there is a possibility that the output transistor M1 is broken. In addition, even though the gate potential of the output transistor M1 increases, if the increase is insufficient and a sufficient on-state of the output transistor M1 is obtained, there is a possibility that the output transistor M1 is broken before completely absorbing ESD electric charges.

In contrast to this, according to the integrated circuit of at least one of the foregoing embodiments, it is possible to surely turn off the output transistor M1 at the time of applying an ESD, regardless of output of the internal circuit 32. In addition, it is possible to control turning on and off of the output transistor M1 at the time of normal operation, depending only on output signals from the internal circuit 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An integrated circuit comprising:
   a first external terminal connected to an external power supply;
   a second external terminal;
   a third external terminal grounded;
   an output transistor having a first electrode connected to the second external terminal, a second electrode connected to the third external terminal, and a control electrode;
   an Electro Static Discharge (ESD) protection circuit connected between the second external terminal and the third external terminal;
   a diode connected between the first external terminal and the second external terminal, with a direction going from the second external terminal toward the first external terminal being set as a forward direction;
   a power supply circuit connected between the first external terminal and the third external terminal;
   an internal circuit connected between an output line of the power supply circuit and the third external terminal;
   a current source circuit including a capacitor and a current source connected in series between the output line of the power supply circuit and the third external terminal; and
   a drive circuit having a first input terminal connected between the capacitor and the current source, a second input terminal connected to an output terminal of the internal circuit, and an output terminal connected to the control electrode of the output transistor,
   when a voltage larger than a maximum rating voltage is applied to the second external terminal, the drive circuit turns off the output transistor and the ESD protection circuit operates.

2. The circuit according to claim 1, wherein, when a voltage larger than the maximum rating voltage is applied to the second external terminal, the current source does not operate.

3. The circuit according to claim 1, wherein when a voltage larger than the maximum rating voltage is applied to the second external terminal, the drive circuit turns off the output transistor, without depending on an output of the internal circuit.

4. The circuit according to claim 1, wherein at the time of normal operation in which a voltage applied to the second external terminal is not more than the maximum rating voltage, the drive circuit turns on and off the output transistor, depending on an output of the internal circuit.

5. The circuit according to claim 1, wherein the drive circuit is a NOR circuit.

6. The circuit according to claim 5, wherein
the capacitor is connected between the output line of the power supply circuit and a first input terminal of the NOR circuit, and
the current source is connected between the first input terminal of the NOR circuit and the third external terminal.

7. The circuit according to claim 6, wherein
a capacitance of the capacitor is larger than a gate capacitance of a transistor connected to the first input terminal in the NOR circuit, and
when a voltage larger than the maximum rating voltage is applied to the second external terminal, a potential of the output line in the power supply circuit rises, an electric charge moves between the capacitor and the gate capacitance of the transistor, a potential of the first input terminal in the NOR circuit rises, and the output transistor turns off.

8. The circuit according to claim 1, wherein the drive circuit includes a NAND circuit.

9. The circuit according to claim 8, wherein
the current source is connected between the output line of the power supply circuit and a first input terminal of the NAND circuit, and
the capacitor is connected between the first input terminal of the NAND circuit and the third external terminal.

10. The circuit according to claim 9, wherein
a capacitance of the capacitor is larger than a gate capacitance of a transistor connected to the first input terminal in the NAND circuit,
when a voltage larger than the maximum rating voltage is applied to the second external terminal, a potential of the output line in the power supply circuit rises, an electric charge moves between the gate capacitance of the transistor and the capacitor, a potential of the first input terminal in the NAND circuit becomes a low level, and the output transistor turns off.

11. The circuit according to claim 1, wherein a capacitance of the capacitor is larger than a gate capacitance of a transistor connected to the first input terminal in the drive circuit.

12. The circuit according to claim 1, wherein
the ESD protection circuit has:
a transistor connected between the second external terminal and the third external terminal; and
a Zener diode connected between the second external terminal and a control electrode of the transistor, and wherein
when the output transistor turns off, a potential of the second external terminal rises, the Zener diode breaks down, and the transistor turns on.

13. The circuit according to claim 12, wherein
at the time of normal operation in which a voltage applied to the second external terminal is not more than the maximum rating voltage, the Zener diode does not break down, and the transistor does not turn on.

14. The circuit according to claim 12, wherein the transistor is a bipolar transistor having a base as the control electrode.

15. The circuit according to claim 1, wherein at the time of normal operation in which a voltage applied to the second external terminal is not more than the maximum rating voltage, the power supply circuit adjusts a voltage of the external power supply and outputs a constant voltage to the output line.

16. The circuit according to claim 1, wherein the output transistor, the ESD protection circuit, the diode, the power supply circuit, the internal circuit, the current source circuit, and the drive circuit are integrated into the same semiconductor substrate.

* * * * *